United States Patent
Borley et al.

(10) Patent No.: US 9,773,329 B2
(45) Date of Patent: Sep. 26, 2017

(54) INTERACTION WITH A GRAPH FOR DEVICE CONTROL

(71) Applicant: INTERNATIONAL BUSINESS MACHINES CORPORATION, Armonk, NY (US)

(72) Inventors: Andrew J. Borley, Hursley (GB); Callum P. Jackson, Hursley (GB); Kathryn M. McMullan, Hursley (GB); Philip L. Norton, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 14/936,881

(22) Filed: Nov. 10, 2015

(65) Prior Publication Data
US 2016/0155251 A1 Jun. 2, 2016

(30) Foreign Application Priority Data
Nov. 27, 2014 (GB) .................................. 1421062.9

(51) Int. Cl.
G06T 11/20 (2006.01)
G06F 3/0488 (2013.01)
G06F 3/0484 (2013.01)

(52) U.S. Cl.
CPC .......... *G06T 11/206* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| | | |
|---|---|---|
| 7,475,351 B1 | 1/2009 | Johnson |
| 8,250,475 B2 | 8/2012 | Malik et al. |
| 8,306,195 B2 | 11/2012 | Gardner et al. |

(Continued)

OTHER PUBLICATIONS

Sebastian Schmidt et al, "A Set of Multitouch Graph Interaction Techniques", ITS 2010: Applications, Nov. 7-10, 2010, Saarbrucken, Germany, Copyright 2010 ACM.*

(Continued)

*Primary Examiner* — Tize Ma
(74) *Attorney, Agent, or Firm* — Richard A. Wilhelm, Esq.; Kevin P. Radigan, Esq.; Heslin, Rothenberg, Farley & Mesiti (57) ABSTRACT

Controlling an electronic device includes: detecting a touch contact with a touch-sensitive display; detecting a first intersection of the contact location with a first edge between first and second nodes; exclusively linking the first edge at the first intersection of the contact location; detecting movement of the contact location and causing the linked first intersection of the first edge to move in concert with the contact location so as to extend the first edge on the display at the intersection, while maintaining a link of the first edge to the first and second nodes; detecting the exceeding of an extensibility limit of the first edge; and based on the exceeding, removing the first edge from the displayed graph and breaking the connection between the first and second nodes of the graph, wherein the signaling connection between the first and second components is broken.

20 Claims, 6 Drawing Sheets (56) References Cited

U.S. PATENT DOCUMENTS

| | | | | |
|---|---|---|---|---|
| 8,832,582 B2* | 9/2014 | Dwyer | ................. | G06T 11/206 |
| | | | | 715/771 |
| 9,189,144 B2* | 11/2015 | Maunder | ............... | G06F 3/0488 |
| 2005/0223225 A1 | 10/2005 | Campbell et al. | | |
| 2010/0073377 A1* | 3/2010 | Cai | ........................ | G06T 13/80 |
| | | | | 345/440 |
| 2011/0249002 A1* | 10/2011 | Duplessis | ............. | G06T 11/206 |
| | | | | 345/440 |
| 2013/0167093 A1 | 6/2013 | Kumar et al. | | |
| 2013/0246958 A1 | 9/2013 | Dwyer et al. | | |
| 2013/0335339 A1 | 12/2013 | Maunder | | |
| 2014/0075345 A1 | 3/2014 | Fippel | | |
| 2014/0184592 A1* | 7/2014 | Belcher | .................. | G06T 19/00 |
| | | | | 345/420 |
| 2015/0112998 A1* | 4/2015 | Shankar | ............ | G06F 17/30312 |
| | | | | 707/741 |
| 2015/0254370 A1* | 9/2015 | Sexton | ............. | G06F 17/30958 |
| | | | | 707/798 |

OTHER PUBLICATIONS

Plambeck et al., "Development and Attributes of z/Architecture and Development", IBM Journal of Research and Development, International Business Machines Corporation (USA), vol. 46, No. 4.5, Jul. 1, 2002, pp. 367-379 (Abstract Only).

Riche et al., "Exploring the Design Space of Interactive Link Curvature in Network Diagrams", Proceedings of the Workshop on Advanced Visual Interfaces (AVI'12), May 21-25, 2012 (8 pages).

IBM Corporation, "Notification of Transmittal of the International Search Report and the Written Opinion", for PCT Application No. PCT/EP2015/054841, dated Jun. 3, 2015 (10 pages).

* cited by examiner

FIG. 4

INTERACTION WITH A GRAPH FOR DEVICE CONTROL

PRIOR FOREIGN APPLICATION

This application claims priority from United Kingdom (GB) patent application number 1421062.9, filed Nov. 27, 2014, which is hereby incorporated herein by reference in its entirety.

BACKGROUND

The present invention provides methods and systems for the control of electronic devices. More particularly embodiments of the present invention provide methods and systems for control of electronic devices comprising graphs comprising nodes and edges.

A touchscreen is a visual display screen for an electronic device which displays a user interface with which a user interacts by touching the screen, for example with a finger or with a stylus. Touchscreens based on several different touch sensing technologies have been developed. Two common types in use today are resistive touchscreens and capacitive touchscreens. Resistive and capacitive touchscreens comprise a touch-sensitive overlay to the display screen which communicates touch position to touchscreen control logic.

Interaction with a touchscreen by a user may take the form of a simple interaction, such as a touch of a finger at the point on the screen where a selectable object is displayed which is interpreted by the touchscreen control logic as a selection of that object. More complex interaction may also be provided for, for example a user may move a touch point in a gesture, the pattern for which is recognized by the touchscreen logic and interpreted as indicating the entry of a command associated with that gesture.

Touchscreens may recognize a single touch point, but most touchscreens in use on current devices are multi-touch touchscreens which are capable of recognizing the position and movement of more than one touch at a time, for example when two or more fingers are moved in relation to each other on the touchscreen. In such multi-touch touchscreens, for example, a gesture comprising the movement apart of two finger touches, or finger and thumb touches, might be recognized as a command to enlarge the display of the object displayed at the position of the gesture.

Devices equipped with touchscreens may comprise touchscreen displays of varying sizes. A particular current growth area is in handheld and other portable mobile electronic devices with integral touchscreens, for example mobile phones (also called cell phones) and tablet computers, in which the size of the display is necessarily limited by the requirement for portability. A mobile phone or cell phone may have a touchscreen display of diagonal size of about 90 mm to 120 mm, for example. A small tablet computer may have a touchscreen display of about 180 mm, for example.

Such portable electronic devices may be used to display control interface software for the control of the interaction of multiple objects represented on the display. For example, a control interface may be used to control the interaction of external electronic devices depicted as nodes in a graph, each node being displayed as an on-screen icon or similar object, the graph representing interaction of a network of nodes. The nodes may be linked by edges, straight or curved lines, each edge representing an interaction between the devices represented by the nodes.

Touchscreen interaction control software provides a user with the ability to add, move and remove nodes, and to add, move and remove edges to control the interaction of the objects represented by the nodes.

United States published patent application number US 2013/0335339 provides methods, computing devices, and computer-readable media for interpreting gestures and triggering actions on a graph when the gestures are detected. The triggered actions may include the addition or deletion of nodes, connections between nodes, or connections between node ports; the expansion or collapse of a set of nodes; or the copying of nodes. The input may describe an action of selecting, dragging, holding, flicking, shaking, pinching, unpinching, or spinning a graphical object such as a node or a connection. Gesture interpretation logic determines whether the input matches a stored or known gesture. If the input matches a gesture, then the gesture interpretation logic may perform an action mapped to the gesture instead of or in addition to the normal action that would otherwise be caused by each individual input.

United States published patent application number US 2013/0246958 describes a link curvature processing module which provides a user with the ability to control the curvature of links in a node-link diagram. As a node-link diagram is displayed to a user, the user may interact with the diagram and adjust the curvature of one or more links in the diagram to improve the readability of the diagram. The user's modification to the curvature of a link alters the shape of the link so that the position of the nodes connected to the link does not change. By providing the user with such control, the user is able to tailor the visual display of the links to the user's preference.

Touchscreen interaction by a user, using a finger for example, is very much less precise than interaction with a user interface using a pointing device, such as a computer mouse. A computer mouse-controlled graphical cursor may be used to define an interaction point as small as a single display pixel. The position of touch interaction using a finger may comprise at least many hundreds of pixels and so the desired point of contact is much more difficult to define. This is a problem when interacting with a graph showing selectable objects which appear close together on the display.

For example, if a user wishes to remove a single edge from the graph by first using a finger to select the edge, it may be difficult to select the correct edge, or to avoid selecting more than one edge, because of the size of the contact location of the finger on the touchscreen. It would be desirable to provide an improved interaction method for the selection and removal of a single edge from a graph.

SUMMARY

In one or more aspects, a method of controlling an electronic device is provided which includes: detecting a touch contact with a touch-sensitive display at a contact location of the electronic device, the electronic device comprising a graph comprising nodes and at least one connecting edge, a first node corresponding to a first component, a second node corresponding to a second component, and a first contacting edge connecting the first and second nodes corresponding to a signaling connection between the components, the touch-sensitive display displaying the graph; detecting a first intersection of the contact location with the first edge between the first node and the second node; exclusively linking the first edge at the first intersection of the contact location; detecting movement of the contact location and causing a linked first intersection of the first edge to move in concert with the contact location so as to extend the first edge on the display at the intersection while maintaining a link of the first edge to each of the first node and the second node; detecting the exceeding of an extensibility limit of the first edge; and based on the exceeding, removing the first edge from the displayed graph and breaking the connection between the first and second nodes of the graph comprised in the device, wherein the signaling connection between the first and second components is broken.

Systems and computer program products relating to one or more aspects are also described and claimed herein. Additional features and advantages are realized through the techniques described herein. Other embodiments and aspects are described in detail herein and are considered a part of the claimed aspects.

BRIEF DESCRIPTION OF THE DRAWINGS

Embodiments of the present invention are described below, by way of example only, with reference to the drawings, in which.

DETAILED DESCRIPTION

Viewed from one aspect, the present invention provides a method of controlling an electronic device comprising a graph displayed on a touch-sensitive, or touchscreen display. The graph comprises nodes and at least one connecting edge. A first node corresponds to a first component, a second node corresponds to a second component, and a first connecting edge connecting the first and second nodes corresponds to a signaling connection between the components. A touch contact is detected with the touch-sensitive display at a contact location. A first intersection of the contact location with a first edge between a first node and a second node is detected. An exclusive link to the contact location is made with the first edge at the first intersection. Movement of the contact location is detected, and the linked first intersection of the first edge is caused to move in concert with the contact location so as to extend the first edge on the display at the intersection whilst maintaining a link of the first edge to each of the first node and the second node. The exceeding of an extensibility limit of the first edge is detected, and, in response to the exceeding, the first edge is removed from the displayed graph and the connection between the first and second nodes of the graph comprised in the device is broken. The signaling connection between the first and second components is thereby broken.

The method may also provide that detecting a second intersection of the contact location with a second edge of the graph after the exclusive linking of the first edge at the first intersection to the contact location is ignored. The display of the second edge may be left unchanged with movement of the contact location after detecting the second intersection and so the second edge of the graph is retained unchanged.

The method may further include detecting an approach of an extensibility limit of the first edge. In response to the detecting, the first edge may be animated so as to indicate the approach to the user.

The method may further provide that animating the first edge include a vibrating appearance of the edge.

The method may further provide that, in response to the detecting of the exceeding of the extensibility limit of the first edge, before the removing of the first edge, the edge be displayed as broken ends attached respectively to the first node and the second node.

In one or more aspects, the component may be a hardware device component. For instance, the hardware device component may be one of: a computing device; a data storage device; a domestic appliance; or an industrial machine.

Viewed from another aspect, the present invention provides an electronic device comprising a graph displayed on a touch-sensitive, or touchscreen display. The graph comprises nodes and at least one connecting edge. A first node corresponds to a first component, a second node corresponds to a second component, and a first connecting edge connecting the first and second nodes corresponds to a signaling connection between the components. A first detecting component may be provided for detecting a touch contact with the touch-sensitive display at a contact location. A second detecting component may be provided for detecting a first intersection of the contact location with a first edge between a first node and a second node. A linking component may be provided for exclusively linking the first edge at the first intersection to the contact location. A third detecting component may be provided for detecting movement of the contact location, and causing the linked first intersection of the first edge to move in concert with the contact location so as to extend the first edge on the display at the intersection while maintaining a link of the first edge to each of the first node and the second node. A fourth detecting component may be provided for detecting the exceeding of an extensibility limit of the first edge. A removing component may be provided for removing, in response to the exceeding, the first edge from the displayed graph, and breaking the connection between the first and second nodes of the graph comprised in the device. The signaling connection between the first and second components is therefore broken.

The device may also include a fifth detecting component for detecting a second intersection of the contact location with a second edge of the graph after the exclusive linking of the first edge at the first intersection to the contact location, and include an ignoring component for ignoring the second intersection, so as to leave display of the second edge unchanged with movement of the contact location after detecting a second intersection, and so as to retain the second edge of the graph.

The device may also include a sixth detecting component for detecting an approach of an extensibility limit of the first edge, and an animating component for, in response to the detecting, animating the first edge so as to indicate the approach to the user.

The animating component may further provide that the animating of the first edge comprises the animating component causing a vibrating appearance of the edge.

The device may also include an edge displaying component for, in response to the detecting of the exceeding of the extensibility limit of the first edge, displaying the edge as broken ends attached respectively to the first node and the second node, before the removing of the first edge by the removing component.

As noted, the component may be a hardware device component. For instance, the hardware device component may be one of: a computing device; a data storage device; a domestic appliance; or an industrial machine.

Viewed from another aspect, the present invention provides a computer program comprising computer program code stored on a computer readable medium to, when loaded into a computer system and executed thereon, cause the computer system to perform a method such as described above.

Note that aspects of the present invention provide a user with a means to selectively break a single link represented by a displayed edge on a touch-sensitive display user interface, while avoiding breaking further links. The user may discern that the edge desired to be broken has been selected because movement of touch contact location will immediately show distortion of the appearance of an exclusively linked edge. If the wrong edge has been selected as evidenced by its displayed distortion, the user may remove touch, the linked edge will return to its original appearance, and the user can make another attempt at linking to the desired edge. Inadvertent breakage of an edge may thereby be prevented. Indication of an imminent edge breakage may further be provided by animating the edge. In addition, visual indication of edge removal may be provided by the display of the broken ends of the edge after breakage and before removal.

Figure 1:
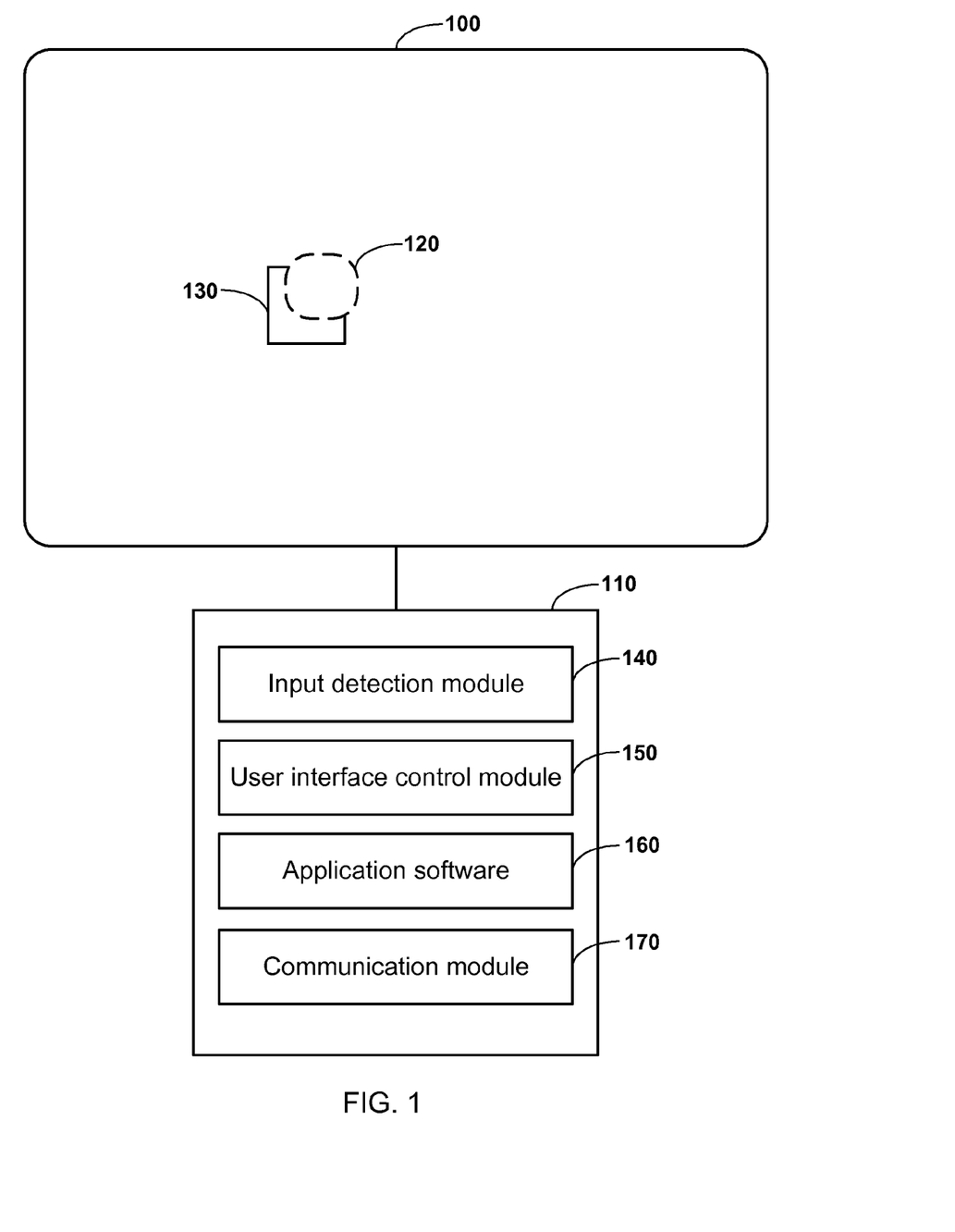
FIG. 1 is a diagrammatic representation of a device to incorporate one or more aspects of the present invention.

FIG. 1 is a diagrammatic representation of elements of a system in which may be employed aspects of the present invention. FIG. 1 illustrates a touch-sensitive, or touchscreen, display 100 of a data processing device 110, according to an embodiment of the present invention. Data processing device 110 may be, for example a portable data processing device such as a tablet computing device or a mobile phone or cell phone. Touchscreen display 100 displays a user interface, such as a graphical user interface, to the user. The user interacts with the displayed user interface by contact, for example with a finger, illustrated by exemplary touch position or contact location 120, for example to select an object 130. It will be apparent to one skilled in the art that touchscreen display 100 may be a stand-alone display, and data processing device 110 may comprise a separate data processing unit located locally to or remotely from touchscreen display 100.

The contact location 120 is sensed by touch sensing functionality of the touchscreen, which, depending on the type of touchscreen, may be for example a touch-sensitive overlay of touchscreen display 100. Signals representative of the contact location 120 are communicated to input detection logic of data processing device 110, illustrated as input detection module 140. The contact location may be output by input detection module 140 as, for example, vertical and horizontal coordinates, or x-axis and y-axis coordinates.

Selection logic, for example in user interface control module 150, receives contact location information from input detection module 140 and determines the coincidence of the contact location coordinates with the coordinates of an object displayed on the user interface, for example, object 130, indicating selection of object 130. User interface control module 150 further comprises logic to control subsequent behavior of selected object 130 in response to user input at contact location 120. For example, determination of coincidence of contact location and object position may cause a linkage of the two, so that further moving of touch position by the user will cause the object to be moved with it.

User interface control module 150 may interact with other device hardware and software, for example, application software 160 of data processing device 110. Elements of input detection module 140 and user interface control module 150 may be embodied as data processing device hardware or data processing device software, for example data processing device system software. Data processing device 110 may also optionally contain communication module 170 for communicating with further devices external to data processing device 110.

Figure 2A:
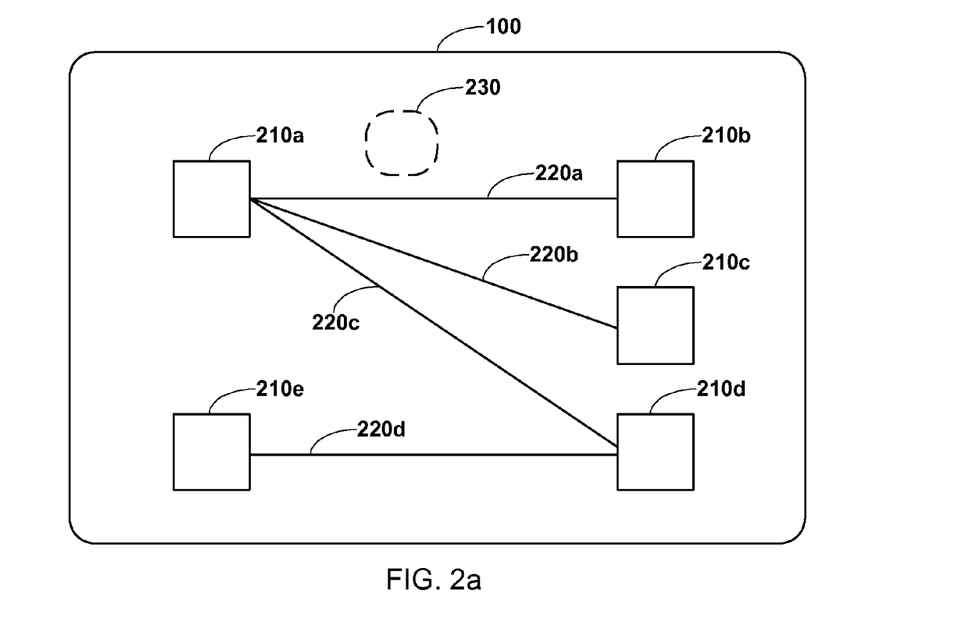
FIGS. 2a-2f illustrate one embodiment of stages in operation of a method, in accordance with one or more aspects of the present invention.

FIGS. 2a to 2f illustrate exemplary operation of one embodiment of the present invention. FIG. 2a illustrates touchscreen display 100 of data processing device 110 as illustrated in FIG. 1. Touchscreen display 100 comprises a graphical user interface displaying a graph comprising edges 220a to 220d linking nodes 210a to 210e. Nodes correspond to components and edges correspond to signaling connections between components. In one example, the displayed graph may comprise a graphical user interface providing an interface to interaction logic for controlling interaction of data processing device 110 with a network of remote components, each component comprising a hardware device. The interaction logic may comprise hardware or software elements, or both hardware and software elements. The interaction logic may reside in data processing device 110 or in a data processing unit or units located remotely from data processing device 110 and in communication with it by wired or wireless connections, or some mixture of the two.

In the present example of operation, each node 210a to 210e may correspond to a component comprising a hardware device capable of communicating with at least one other hardware device, so that each hardware device is represented by its respective node. Edges 220a to 220d on the graph correspond to signaling connections, or communicating interaction links, between the components comprising hardware devices. In this example, a user may wish to terminate the communicating interaction between the hardware device represented by node 210a and that represented by node 210b by breaking the link between them represented by edge 220a.

In one embodiment, as illustrated in FIG. 2a, the user commences interaction with the displayed user interface by touching touchscreen display 100 at touch position or contact location 230, for example with a finger. Input detection module 140 detects contact location 230 and outputs this as x-axis and y-axis coordinates to user interface control module 150 which registers this position in relation to objects displayed on the user interface on touchscreen display 100.

Figure 2B:
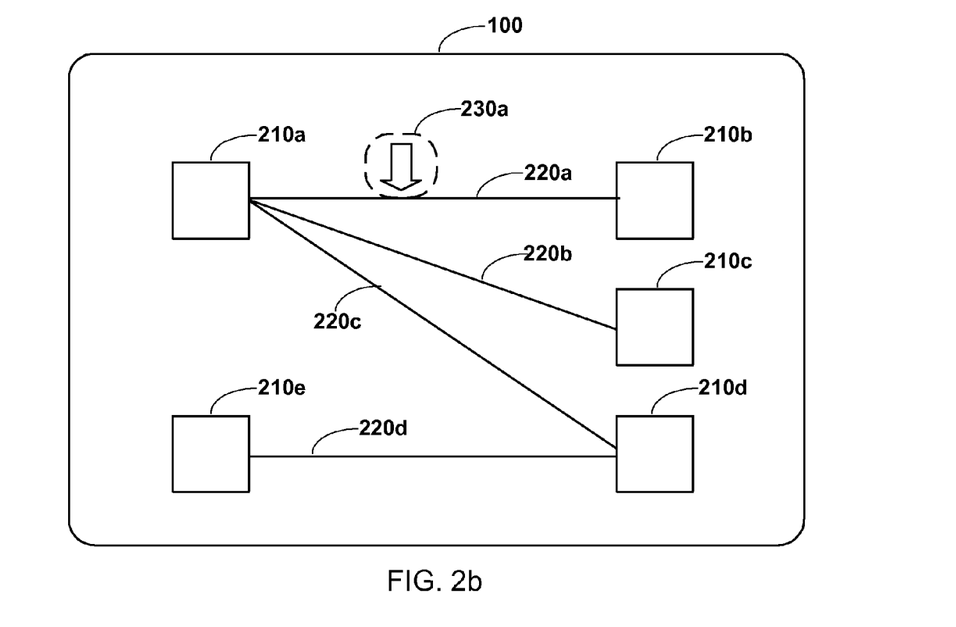

In FIG. 2b, the user moves the contact location 230 in the direction shown by the overlaid arrow to position 230a. At position 230a, user interface control module 150 recognizes the coincidence or intersection of contact location at contact location 230a with displayed edge 220a. User interface control module 150 may comprise logic which interprets the intersection as the making of an exclusive link between contact location at contact location 230a and edge 220a at the position of the intersection on edge 220a. The term "exclusive link" means in this embodiment that further movement of contact location from contact location 230a will involve the linked movement of edge 220a on the user interface of touchscreen display 100 in a manner as described hereinafter, and the prevention of any linking of contact location with any further edges passed over by the contact location as it is moved further by the user.

Figure 2C:
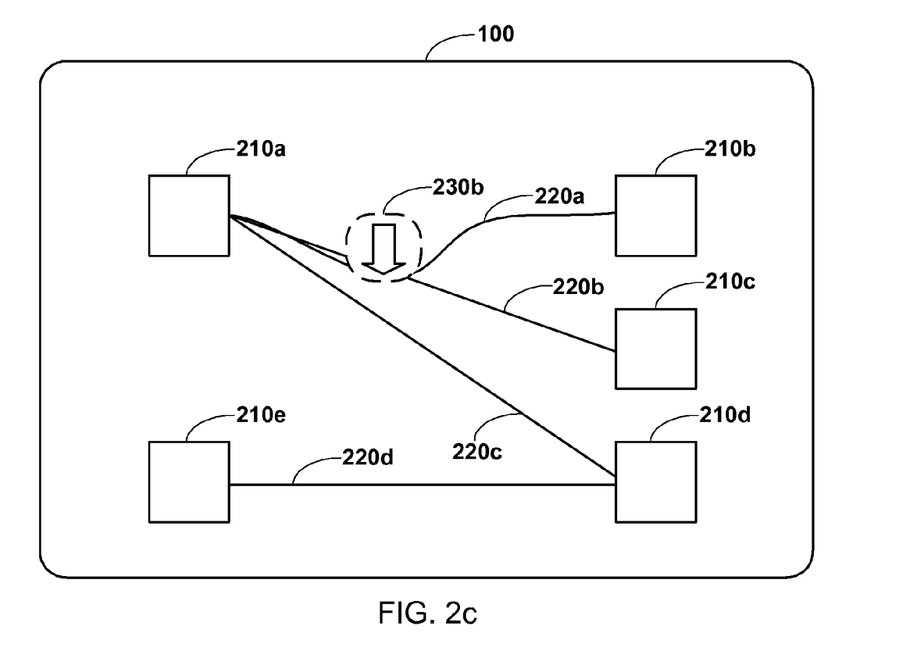

In FIG. 2c, the user moves contact location further to contact location 230b as shown by the overlain arrow. User interface control module 150 maintains the link with edge 220a at the intersection position of edge 220a. The intersection position of edge 220a moves in concert with contact location as this is moved to touch position 230b and beyond. User interface control module 150 causes the appearance of edge 220a on the user interface as displayed on touchscreen display 100 to be distorted and extended to either side of touch position 230b, for example in a manner akin to the distortion or "stretching" of a resilient member.

It will be apparent that although distorted edge 220a has been illustrated as a curved line, it may alternatively be displayed as two straight line portions from contact location at touch position 230b to respectively node 210a and node 210b, or in any other suitable way, without departing from the scope of the invention. If at this point, the user were to cease to touch the touchscreen display 100 so that the contact location is removed, the exclusive link between contact location and edge 220a would be broken and the original appearance of edge 220a as shown in FIG. 2a would be restored, so that the connection represented by edge 220a between node 210a and node 210b would be maintained.

Figure 2D:
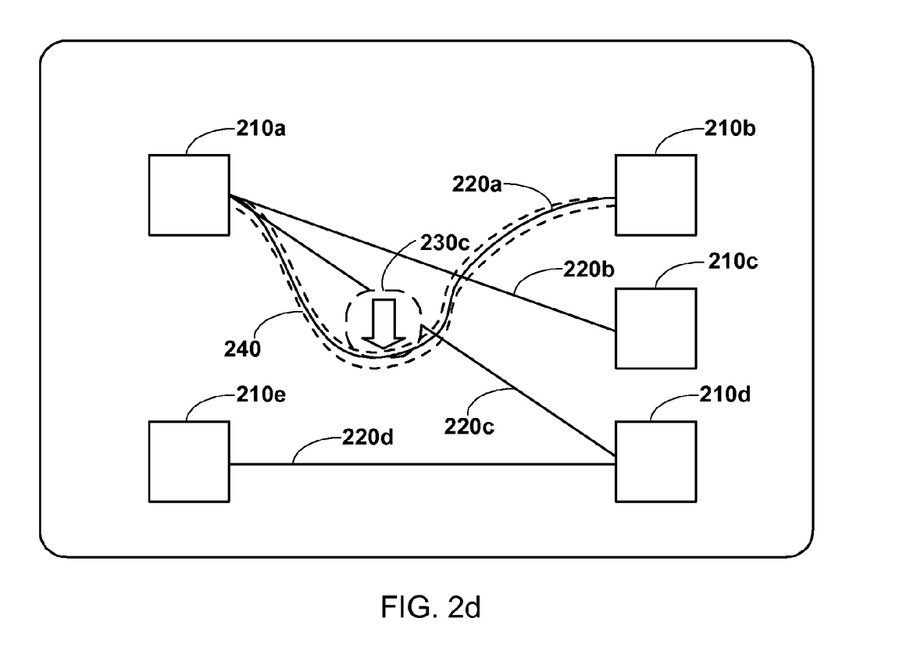

In FIG. 2d, the user moves contact location further to contact location 230c as shown by the overlain arrow and the appearance of edge 220a is further extended. Although the user has moved contact location over both edges 220b and 220c so as to produce an intersection with each edge in turn, neither is linked to the contact location because user interface control module 150 has previously created an exclusive link with edge 220a so that further intersections are ignored. At position 230c, displayed edge 220a has reached a limit of extensibility as defined in user interface control module 150. For example, the limit of extensibility may be predefined and recorded in logic of user interface control module 150 and expressed as a ratio of total length of extended edge 220a in FIG. 2d to original length of edge 220a in FIG. 2a. In an example the ratio may be 1.5. The approach of the extensibility limit may be indicated visually to the user by changing the appearance of edge 220a as the limit is approached. In an embodiment, the approach of the extensibility limit may be indicated by animating extended edge 220a. In one embodiment, the animating may be a vibrating appearance of edge 220a. This is illustrated on FIG. 2d by dashed lines 240. It will be apparent that any suitable visual indication may be provided without departing from the scope of the present invention.

Figure 2E:
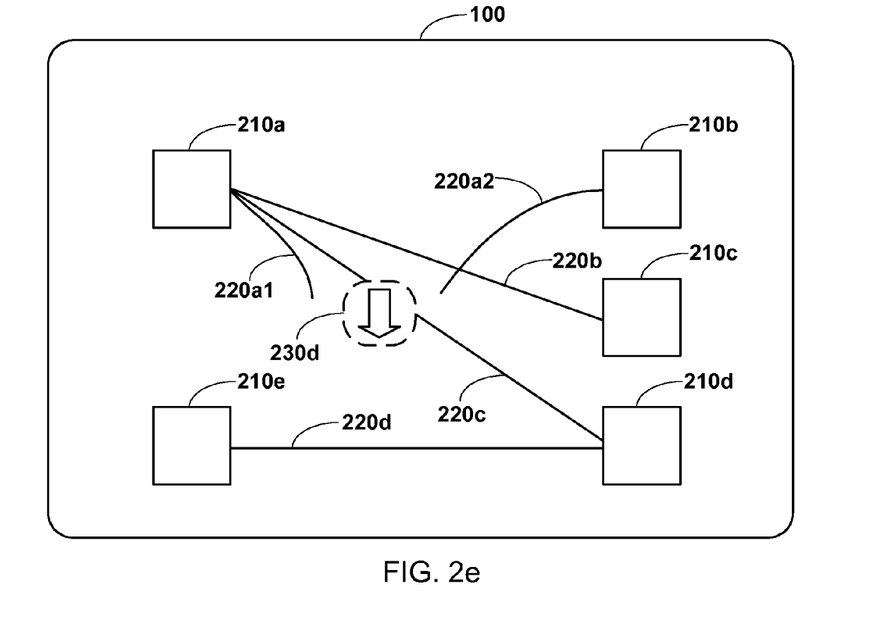

User interface control module 150 recognizes that the limit of extensibility has been reached (in the example it recognizes that the ratio of the current length of extended edge 220a as displayed to the original displayed length of edge 220a in FIG. 2a has reached 1.5). In FIG. 2e, the user moves contact location further as indicated by the overlain arrow at touch position 230d. User interface control module 150 responds to the resulting exceeding of the limit of extensibility by breaking edge 220a displayed on the user interface of touchscreen display 100. User interface control module 150 signals this link breakage event to further processing logic of device 110. This may be, for example, by using application software 160 and communication module 170 to signal to hardware devices represented by displayed nodes 210a and 210b that the communicating interaction between them represented by edge 220a is now terminated.

Figure 2F:
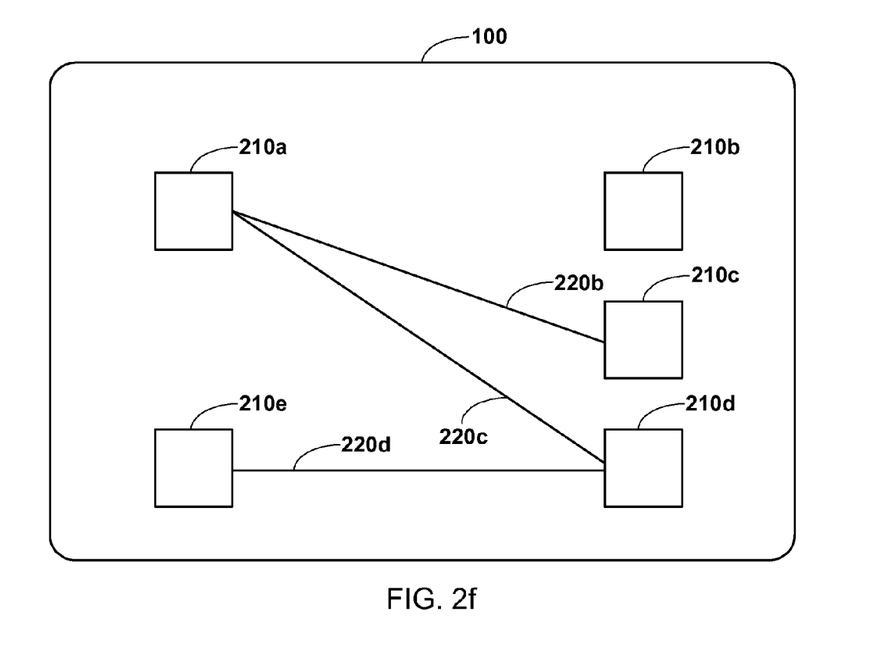

The breakage of the link represented by edge 220a may be indicated visually to the user. This may be, for example, as shown in FIG. 2e, by for a short period of time displaying the broken edge 220a as two partial remainder portions 220a1 and 220a2 extending from nodes 210a and 210b, respectively, before removing edge 220a from the displayed graph. After breakage of the link, the user may remove their touch at the contact location from touchscreen display 100. The final appearance of the graph displayed on the user interface of touchscreen display 100 is shown in FIG. 2f, the absence of edge 220a indicating the breakage of the communicating interaction between hardware devices represented by nodes 210a and 210b.

It will be apparent from the above that embodiments of the invention describe a gesture for interaction with a graph displayed on a user interface of a touchscreen. The gesture comprises in summary a touch, swipe and breakage gesture for interaction on a touchscreen with an edge displayed on a graph of the touchscreen user interface. The gesture may further comprise an animating of the edge as an extensibility limit is approached, and the displaying of broken ends of the edge before the edge is removed from the graph. The removal of the edge by user interaction may be described in summary as a "stretch and snap" action.

Figure 3:
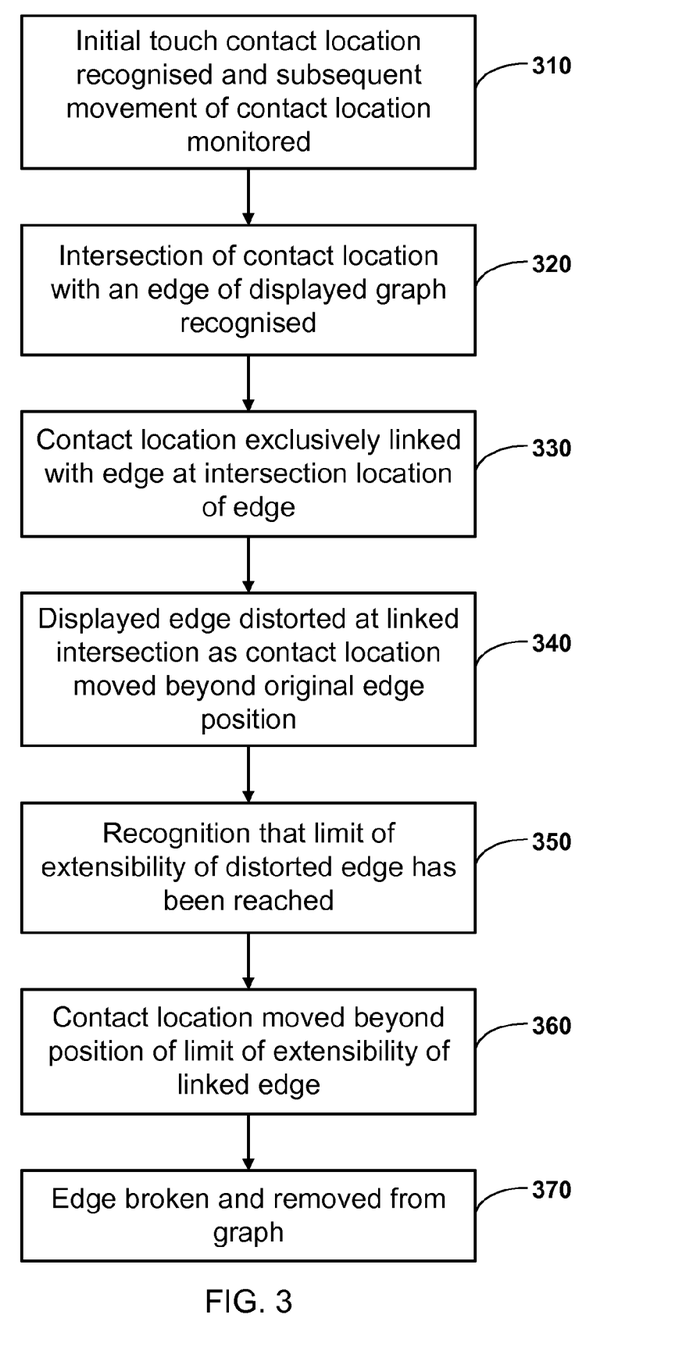
FIG. 3 is a flowchart of one embodiment of a process, in accordance with one or more aspects of the present invention.

FIG. 3 illustrates a flowchart describing the operation of a one embodiment of the present invention. At step 310, a user touches touchscreen 100, for example with a finger, at a touch contact location near to an edge of a graph displayed on a graphical user interface of device 110, for example edge 220a. The initial contact location 230 is recognized by touch sensing functionality of touchscreen 100, and communicated to input detection module 140. Input detection module 140 outputs coordinates of the contact location 230 to user interface control module 150. The user subsequently moves their finger across the surface of touchscreen 100 towards edge 220a. Movement of contact location 230 is reflected by changing coordinates of contact location output by input detection module 140 and received by user interface control module 150.

At step 320, intersection of contact location with edge 220a, that is coincidence of their display coordinates, of the displayed graph is recognized at contact location 230a by user interface control module 150. Interaction logic of user interface control module 150 interprets the intersection as a user request to select edge 220a. In response, at step 330, user interface control module 150 exclusively links contact location at contact location 230a to edge 220a.

The user continues to move contact location in an approximately straight line across touchscreen 100. In response at step 340 user interface control module 150 distorts the appearance of displayed edge 220a so that the edge appears attached to the user contact location at the position of intersection on the edge 220a as contact location is moved by the user. This edge distortion appears akin to a "stretching" operation on a resilient member. The visual cues provided by this change of appearance mean that the user can confirm that the correct edge has been selected for removal. Furthermore, if the wrong edge is selected, the user can correct this by removal of touch from touchscreen display 100 or reversal of movement of contact location.

At step 350, user interface control module 150 recognizes that a predefined limit of extensibility of edge 220a has been reached. Such a limit of extensibility may be expressed for example as a ratio of the total length of the extended edge to the length of the originally displayed edge. The approach of the limit of extensibility may be indicated visually by changing the appearance of edge 220a as described with reference to FIG. 2d, for example by an animation, for example a vibrating appearance, of edge 220a.

At step 360, the user moves contact location beyond the position of limit of extensibility of the linked edge. At step 370, user interface control module 150 causes the edge to be broken and removed from the graph. The removal may be indicated visually by displaying two broken ends of the broken edge before removal from the displayed graph, for example as described above with reference to FIG. 2e.

Various aspects of the present invention have been described above with reference to controlling the interaction of hardware devices represented by nodes of a graph displayed on a touchscreen display.

Aspects of the invention provide a user with a means to selectively break a single link represented by a displayed edge on a touchscreen user interface whilst avoiding breaking further links. This may be an issue where the touch interaction is inherently imprecise as when touch interaction is by a user's finger, for example. The user may discern that the edge desired to be broken has been selected because movement of touch contact location will immediately show distortion of the appearance of an exclusively linked edge. If the wrong edge has been selected as evidenced by its displayed distortion, the user may remove touch, the linked edge will return to its original appearance, and the user can make another attempt at linking to the desired edge. Inadvertent breakage of an edge may thereby be prevented. Indication of an imminent edge breakage may further be provided by animating the edge. In addition, visual indication of edge removal may be provided by the display of the broken ends of the edge after breakage and before removal.

Aspects of the invention may be used in a home automation system. In such a system, nodes of the graph may correspond to components comprising particular hardware devices in a user's home which may be remotely controlled. Other nodes may correspond to components comprising functions performed by devices. The user may link devices by drawing edges between them. The user may also link particular functions represented by other nodes to devices by drawing edges between function nodes and device nodes. Embodiments of the invention may then be used in the breakage of such links.

Aspects of the invention may be used in a portable device to remotely control the configuration and/or operation of a data processing or data storage network by a technician.

Aspects of the invention may be used in the configuration of a business process management system, or workflow system. In such an example, nodes correspond to particular business process or workflow functions, and edges correspond to the linkage of these functions.

Aspects of the invention may be used in many environments comprising configuration or control of components. Components may be hardware device components, including computing devices, data storage devices, domestic appliances, and industrial machines.

It will be apparent to a person skilled in the art that aspects of the invention may be used in numerous other situations in which a user interface is used, the user interface comprising a graph with nodes linked by edges, each node corresponding to a component and each edge to a signaling connection between two components.

Those skilled in the art will note that a method is provided herein for controlling an electronic device having a touch-sensitive display, or touchscreen. The control includes a graph having nodes and at least one connecting edge displayed on the touchscreen. Each node corresponds to a component, and each edge to a signaling connection. A touch contact is detected, and when the contact location makes an intersection with an edge between a first node and a second node, an exclusive link is made between the contact location and the edge at the intersection point. Further movement of the contact location is detected and the intersection of the edge is caused to move in concert with the contact location. The displayed edge is extended at the intersection while maintaining a link of the edge to each of the first and second displayed node, so as to resemble the stretching of a resilient member. The exceeding of an extensibility limit of the edge is detected, and the edge is broken and removed from the display, breaking the connection between the first and second nodes of the graph, and so also the signaling connection between the components. The method provides a touch, swipe and breakage gesture for interaction on a touchscreen with a graph edge for controlling the device, or in other words a "stretch and snap" interaction with the graph edge. The method may be used to control hardware devices represented by the displayed nodes and whose interaction is represented by displayed edges.

Figure 4:
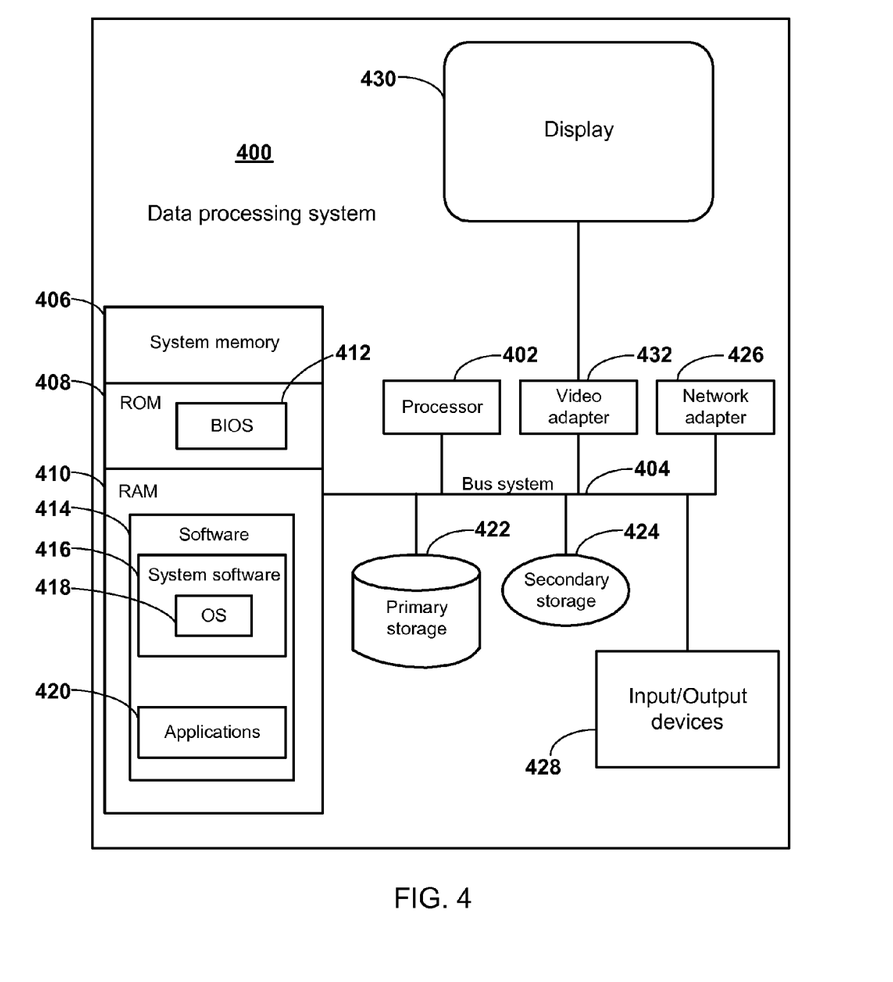
FIG. 4 illustrates an exemplary system for implementing one or more aspects of the present invention.

FIG. 4 illustrates an exemplary system for implementing aspects of the present invention. Data processing system 400 operable for storing and/or executing program code includes at least one processor 402 coupled directly or indirectly to memory elements through a system bus 404. The memory elements may comprise local memory employed during actual execution of the program code, bulk storage memory, and cache memory for providing temporary storage of at least some program code in order to reduce the number of times program code must be retrieved from bulk storage during program execution.

Memory elements may comprise system memory 406 in the form of non-volatile read only memory (ROM) 408 and volatile random access memory (RAM) 410. A basic input/output system (BIOS) 412 may be stored in ROM 408. Software 414 may be stored in RAM 410. Software 414 may comprise system software 416, which may comprise operating system software 418, and software applications 420.

Memory elements may also comprise primary storage means 422 which may comprise a magnetic hard disc drive, and secondary storage means 424 which may comprise an optical disc drive or a magnetic disc drive. The primary and secondary storage means and their associated computer-readable storage media provide non-volatile storage of computer-executable instructions, data structures, program modules and other data for data processing system 400. Software applications may be stored on the primary and secondary storage means 422, 424 as well as in system memory 406.

Data processing system 400 may operate in a networked environment using logical connections to one or more remote data processing systems via network adapter 426.

Input/output (I/O) devices 428 may be coupled to the system either directly or through intervening I/O controllers. A user may enter commands and information into system 400 through input devices such as a keyboard, pointing device such as a mouse, or other input devices such as microphone, joystick, trackball, touchpad, game controller, satellite dish, scanner etc. Output devices may comprise printers, speakers etc. Display device 430 may also be connected to system bus 404 via an interface such as video adapter 432.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of controlling an electronic device, the method comprising:
   detecting a touch contact with a touch-sensitive display at a contact location of the electronic device, the electronic device comprising a graph comprising nodes and at least one connecting edge, a first node corresponding to a first component, a second node corresponding to a second component, and a first connecting edge connecting the first and second nodes corresponding to a signaling connection between the components, the touch-sensitive display displaying the graph;
   detecting a first intersection of the contact location with the first edge between the first node and a second node;
   exclusively linking the first edge at the first intersection to the contact location;
   detecting movement of the contact location and causing the linked first intersection of the first edge to move in concert with the contact location so as to extend the first edge on the display at the intersection while maintaining a link of the first edge to each of the first node and the second node;

detecting the exceeding of an extensibility limit of the first edge; and based on the exceeding, removing the first edge from the displayed graph and breaking the connection between the first and second nodes of the graph comprised in the device, wherein the signaling connection between the first and second components is broken.

2. The method of claim 1, further comprising:

detecting a second intersection of the contact location with a second edge of the graph after the exclusive linking of the first edge at the first intersection to the contact location;

ignoring the second intersection so as to leave display of the second edge unchanged with movement of the contact location after detecting a second intersection and so as to retain the second edge of the graph.

3. The method of claim 1, further comprising:

detecting an approach of an extensibility limit of the first edge;

based on the detecting, animating the first edge so as to indicate the approach to the user.

4. The method of claim 3, further comprising:

the animating the first edge comprising a vibrating appearance of the edge.

5. The method of claim 1, further comprising:

based on the detecting of the exceeding of the extensibility limit of the first edge, before the removing of the first edge, displaying the edge as broken ends attached respectively to the first node and the second node.

6. The method of claim 1, wherein at least one of the first or second component comprises a hardware device component.

7. The method of claim 6, wherein the hardware device component comprises one of: a computing device; a data storage device; a domestic appliance; or an industrial machine.

8. A system for controlling an electronic device, the system comprising:

a memory;

a processing device communicatively coupled to the memory, wherein the system performs a method comprising:

detecting a touch contact with a touch-sensitive display at a contact location of the electronic device, the electronic device comprising a graph comprising nodes and at least one connecting edge, a first node corresponding to a first component, a second node corresponding to a second component, and a first connecting edge connecting the first and second nodes corresponding to a signaling connection between the components, the touch-sensitive display displaying the graph;

detecting a first intersection of the contact location with the first edge between the first node and a second node;

exclusively linking the first edge at the first intersection to the contact location;

detecting movement of the contact location and causing the linked first intersection of the first edge to move in concert with the contact location so as to extend the first edge on the display at the intersection while maintaining a link of the first edge to each of the first node and the second node;

detecting the exceeding of an extensibility limit of the first edge; and based on the exceeding, removing the first edge from the displayed graph and breaking the connection between the first and second nodes of the graph comprised in the device, wherein the signaling connection between the first and second components is broken.

9. The system of claim 8, wherein the system further performs:

detecting a second intersection of the contact location with a second edge of the graph after the exclusive linking of the first edge at the first intersection to the contact location;

ignoring the second intersection so as to leave display of the second edge unchanged with movement of the contact location after detecting a second intersection and so as to retain the second edge of the graph.

10. The system of claim 8, wherein the system further performs:

detecting an approach of an extensibility limit of the first edge;

based on the detecting, animating the first edge so as to indicate the approach to the user.

11. The system of claim 10, wherein the system further performs:

the animating the first edge comprising a vibrating appearance of the edge.

12. The system of claim 8, wherein the system further performs:

based on the detecting of the exceeding of the extensibility limit of the first edge, before the removing of the first edge, displaying the edge as broken ends attached respectively to the first node and the second node.

13. The system of claim 8, wherein at least one of the first or second component comprises a hardware device component.

14. The system of claim 13, wherein the hardware device component comprises one of: a computing device; a data storage device; a domestic appliance; or an industrial machine.

15. A computer program product for controlling an electronic device, the computer program product comprising:

a computer readable storage medium having program instructions embodied therewith, the program instructions being executable by a processor to perform a method comprising:

detecting a touch contact with a touch-sensitive display at a contact location of the electronic device, the electronic device comprising a graph comprising nodes and at least one connecting edge, a first node corresponding to a first component, a second node corresponding to a second component, and a first connecting edge connecting the first and second nodes corresponding to a signaling connection between the components, the touch-sensitive display displaying the graph;

detecting a first intersection of the contact location with the first edge between the first node and a second node;

exclusively linking the first edge at the first intersection to the contact location;

detecting movement of the contact location and causing the linked first intersection of the first edge to move in concert with the contact location so as to extend the first edge on the display at the intersection while maintaining a link of the first edge to each of the first node and the second node;

detecting the exceeding of an extensibility limit of the first edge; and based on the exceeding, removing the first edge from the displayed graph and breaking the connection between the first and second nodes of the graph comprised in the device, wherein the signaling connection between the first and second components is broken.

16. The computer program product of claim 15, further comprising:

detecting a second intersection of the contact location with a second edge of the graph after the exclusive linking of the first edge at the first intersection to the contact location;

ignoring the second intersection so as to leave display of the second edge unchanged with movement of the contact location after detecting a second intersection and so as to retain the second edge of the graph.

17. The computer program product of claim 15, further comprising:

detecting an approach of an extensibility limit of the first edge;

based on the detecting, animating the first edge so as to indicate the approach to the user.

18. The computer program product of claim 17, further comprising:

the animating the first edge comprising a vibrating appearance of the edge.

19. The computer program product of claim 15, further comprising:

based on the detecting of the exceeding of the extensibility limit of the first edge, before the removing of the first edge, displaying the edge as broken ends attached respectively to the first node and the second node.

20. The computer program product of claim 15, wherein at least one of the first or second component comprises a hardware device component.

* * * * *